Sept. 28, 1965  B. S. HUTCHINS ETAL  3,208,699
ENGINE TRANSPORT STAND
Filed April 12, 1963
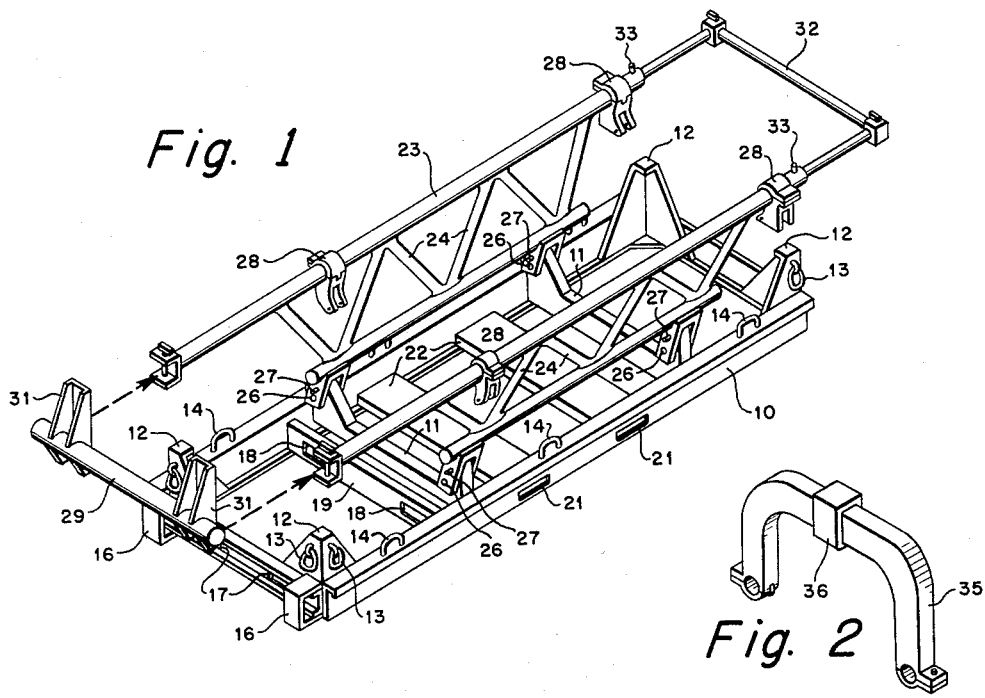
Fig. 1
Fig. 2
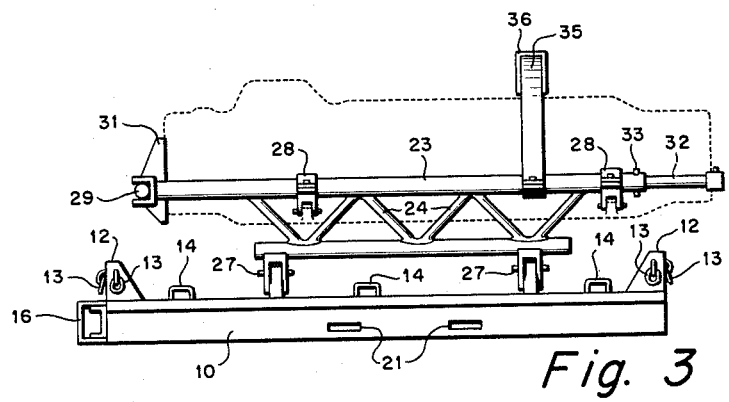
Fig. 3
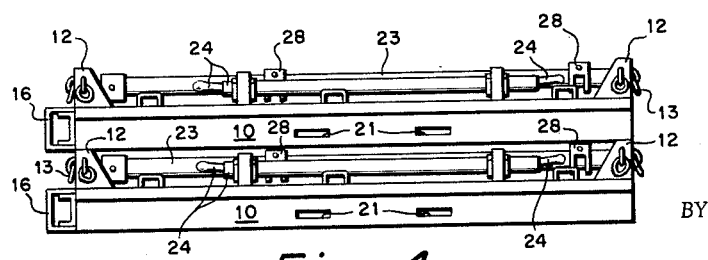
Fig. 4
INVENTORS
BLANCHARD S. HUTCHINS
PAUL KARNOW
BY
*Henry Hansen*
ATTORNEY

3,208,699
ENGINE TRANSPORT STAND
Blanchard S. Hutchins, Warrington, and Paul Karnow, Glenside, Pa., assignors to the United States of America as represented by the Secretary of the Navy
Filed Apr. 12, 1963, Ser. No. 272,811
2 Claims. (Cl. 248—13)
(Granted under Title 35, U.S. Code (1952), sec. 266)

The invention described herein may be manufactured and used by or for the Government of the United States of America for governmental purposes without the payment of any royalties thereon or therefor.

The present invention relates to article carrying apparatus and more particularly to an engine transport stand suitable for air shipping many types of modern aircraft engines and capable of being used with a variety of handling equipment.

The growing family of jet engines, having distinctively different form factors and configurations then reciprocating engines, has brought with it a new and large variety of carrying containers for distributing or shipping replacement and repaired engines over air routes. Jet engines are most commonly shipped, with their afterburners removed if so equipped, in a steel container tailored for each type of engine. Separate enclosures carry the afterburner when it is necessary for them also to be shipped. This concept has become increasingly burdensome and logistically imprudent. Numerous attempts to depart from the use of steel containers have been made in recent years but each has produced techniques lacking in some features especially important to the military needs or has sacrificed some of the advantages in the state-of-the-art apparatus and methods of material handling as applied to air freight transportation.

Accordingly, it is an object of the present invention to provide a universal lightweight jet engine transport stand for facilitating air shipping numerous types of existing and contemplated jet engines, which affords ease of handling and loading with conventional materials handling equipment, which affords ease of installation or dismantling of an engine without hindrances, and which is strong and shock-resistant.

Another object of the invention is to provide a new and improved engine transport stand which can be collapsed into a low profile when empty and stacked with others occupying thereby a minimum storage or cargo space, which can be used for end-loaded or side-loaded aircraft with either cargo hoists or forklift trucks, and in which protection is provided for the engine against damage caused by the engine bumping against handling and loading equipment, fuselage, and other obstacles.

A further object of the invention is to provide an improved engine transport stand which permits the lowest practical location of the center of gravity of the engine when mounted on the stand, which affords relatively small profile and outline dimensions while still providing peripheral protections to the engine mounted on the stand, and which will present minimum load concentrations and optimum securing facilities in a cargo aircraft.

Still another object of the invention is to provide an improved engine transport stand of extremely simple design to permit its fabrication at a field station to satisfy a depleted stand supply, which can be constructed of basic structural materials, and which is relatively inexpensive to manufacture.

Various other objects and advantages will appear from the following description of one embodiment of the invention, and both novel features will be particularly pointed out hereinafter in connection with the appended claims.

In the drawing:
FIG. 1 represents an isometric view of one inventive embodiment of the engine transport stand in an erect position ready for receiving a jet engine;
FIG. 2 represents an isometric view of a yoke used for securing certain types of engines in the transport stand shown in FIG. 1;
FIG. 3 represents a side view of the transport stand with a typical engine secured thereon; and
FIG. 4 represents a side view of two transport stands in a collapsed position and stacked for storage.

In the illustrated embodiment of the invention, the engine transport stand, FIG. 1, obtains primary structural support from an elongated, rectangular base 10 preferably constructed of a rigid aluminum alloy having lightweight, strength and hardness properties to withstand the rough handling usually expected in cargo shipping. The side members of the base 10 are maintained in fixed relationship to each other by reinforcing crossbars 11. Each corner of the base 10 has secured thereto an upwardly extending pillar 12 which is used to support another transport stand base in spaced relation thereon when the stand is collapsed and placed in a stack in the manner illustrated in FIG. 4 and explained hereinbelow. The pillars 12 each include two corner tiedown rings 13 for securing the base 10 against sliding when stored in a vehicle or they may be used as convenient rigging connections during loading and handling. Three side fasteners 14 spaced along each side member of the base 10 provide for cargo hook connections in addition to performing the same functions as described for the rings 13. A pair of bumpers 16 adjacent to the sides and projecting from one end of the base 10 provide collision protection to the engine at that end, and also act as a spacer in end-to-end storage arrangements.

Different aircraft and ground operations require different loading techniques. For instance, forklift trucks are used instead of cargo hoists. In some cargo aircraft, the forklift truck must end-load the transport stand; and in other aircraft, the stand must be side-loaded. For end-loading, a pair of fork lift holes 17 are provided in one of the end members of the base 10 for receiving the two forks of the lift truck. When the forks are fully inserted, their ends further engage another pair of forklift holes 18 formed in a crossmember 19 secured at its ends between the two side members of the base 10. Fully engaged, the forks of the lift truck support the transport stand in cantilever fashion for end-loading into an aircraft. Forklift holes 21 are also provided, a pair in each of the side members of base 10, to receive the forks of the lift truck for side-loading circumstances. Two parallel, inverted channel members 22 extend across the base 10 between oppositely aligned holes 21. Thusly, the forks of the lift truck only need to be inserted an amount sufficient to provide safe securement and cantilever support within the design limits.

A pair of parallel side rails 23, preferably constructed of tubular aluminum alloy, are each orbitally supported by a truss 24 at a respective side member of the base about a pivotal connection 26 so that each side rail 23 can be orbited about the pivotal connection from an erected or extended position as shown in FIG. 1 to a collapsed or retracted position as shown in FIG. 4. When the side rails 23 are erected, removable locking pins 27 can be manually inserted in both the trusses 24 and the base 10 to prevent inadvertent collapsing of the side rails 23 into the base 10.

The invention as thus far described forms the basic support elements of the transport stand to which various adapters of fittings are to be selectively added and adjusted for securing to a particular jet engine configuration on the stand. One contemplated type of adapter takes the form of clamps 28 which are clamped along the length of each side rail 23 at adjustable positions adjacent to lugs, bolts or similar fittings formed or provided on the particular engine. These clamps 28 have various mating configurations, such as a clevis or lug, for being positively secured to the engine fittings. The number of mating variations required are relatively few for all types of engines, so that only several types of clamps 28 are needed to achieve complete versatility. Another contemplated type of adapter which can be used with certain types of engines is a footrail 29 which can be secured across corresponding ends of the side rails 23 such as by clevises. The footrail 29 includes a pair of pads 31 for securing the engine longitudinally on the stand, and also protects the engine at usually machined surfaces against being bumped and damaged. An end guardrail 32 telescopingly extending from the other ends of the side rails 23 also provides protection against bumping and damaging of the engine. Detent pins 33 fix the end guardrail 32 in a desired extended position.

Still another adapter type is contemplated for certain engines and is shown separately in FIG. 2. In this type, a yoke 35 is formed at its two ends into clamps for securing to the respective side rails 23 at a position along their length whereby fitting on the top of the engine can be secured to a mating fitting 36 in the middle of the yoke 35. This type adapter may also be used with a sling where there is no other convenient support connections on the engine.

The many variations in engine configurations existing or contemplated will, of course, dictate the number of different combinations of these adapters to be employed which will insure complete versatility of the engine transport stand. One typical application of the above-mentioned types of adapters should demonstrate this versatility and is shown in FIG. 3 wherein an engine, shown in phantom outline, is secured in the transport stand by four clamps 28 (two on each side), the footrail 29, and the yoke 35. Certain engines to be transported may not require certain adapters such as the footrail 29 or the yoke 35. In these instances, these adapters are conveniently stored in the base 10 of the transport stand by clamps, not shown. In this way the stand travels about as a complete unit suitable for all engines irrespective of its present application.

When the engine transport stand is empty and it is to be stored or returned to its sender along with other empty stands, all of the adapters and the end guard 32 can be conveniently stored within the base 10, the locking pins 27 may be removed and the side rails 23 folded into the base 10 forming thereby a shallow profile for stacking several stands on top of each other in the manner shown in FIG. 4. Thusly, a large number of empty transport stands can be shipped in a minimum air cargo space.

Many of the attendant advantages and improvements manifested by the engine transport stand of the present invention should now be apparent. For example, a large variety of jet engine configurations can be transported by merely varying the position and combination of the adapters on the basic stand structure. In addition to its universal applicability, the stand is suitable for use with many types of material handling equipment and techniques, and may be collapsed into a very compact and lightweight form for storage or for return shipment in minimal air cargo space. The invention also affords ease in maintaining the lowest practical location of the center of gravity of the engine when mounted on the stand. Its construction is extremely simple thereby permitting it to be fabricated at a remote field activity with a minimum of mechanical skill, facilities, or choice of materials.

It will be understood that various changes in the details, materials, steps and arrangement of parts, which have been herein described and illustrated in order to explain the nature of the invention may be made by those skilled in the art within the principle and scope of the invention as expressed in the appended claims.

What is claimed is:

1. A universal jet engine stand especially suitable for use in air transportation, comprising:
   an elongated rectangular base;
   a pair of parallel side rails;
   a pair of trusses, each supporting a side rail and pivotally connected on an axis parallel to a respective side member of said base, for maintaining said side rails in parallel relation to each other and to the side members of said base;
   locking pins selectively connected between said base and said trusses for erecting or collapsing said rails and trusses about the pivotal axes;
   four pillars, each extending upwardly from a corner of said base, for supporting other stands in a stacked relationship;
   a plurality of clamps selectively clamped at adjustable positions along the length of said side rails and to be mated with fittings laterally disposed on an engine to be supported thereby;
   a footrail selectively connected between corresponding ends of said side rails for providing longitudinal securement to the engine to be supported;
   a yoke selectively connected at its ends between said side rails along the lengths thereof and mated with fittings near the top of an engine to be supported thereby;
   a guardrail selectively connected at the other corresponding ends of said side rails for protecting an engine enclosed therein against bumping; and
   a pair of bumpers, each adjacent to a side of said base and extending from one end thereof, for maintaining a fixed spatial relationship at said end from other obstacles.

2. A universal engine stand especially suitable for use in air transportation, comprising:
   a rectangular base;
   a pair of parallel side rails;
   a pair of truss members, each supporting a side rail and pivotally conncected on an axis parallel to a respective side member of said base, for maintaining said side rails in parallel relation to each other and to the side members of said base;
   locking pins selectively connected between said base and said trusses for erecting or collapsing said rails and trusses about the pivotal axes;
   four pillars, each extending upwardly from a corner of said base, for supporting other stands in a stacked relationship;
   a plurality of clamps selectively clamped at adjustable positions along the length of said side rails and mated with fittings laterally disposed on an engine to be supported thereby;
   a footrail selectively connected betwen corresponding ends of said side rails for providing longitudinal securement to the engine to be supported; and
   a yoke selectively connected at its ends between said side rails along the lengths thereof and to be mated with fittings at the top of an engine to be supported thereby.

References Cited by the Examiner

UNITED STATES PATENTS

| | | | |
|---|---|---|---|
| 2,198,674 | 4/40 | Lord | 248—119 X |
| 2,341,801 | 2/44 | Miller | 248—119 X |
| 2,594,586 | 4/52 | Ries | 248—13 X |
| 2,817,304 | 12/57 | Newcomer et al. | 248—119 X |
| 2,956,763 | 10/60 | D'Arca | 108/53 |
| 3,118,400 | 1/64 | Kemp | 108—58 |
| 3,151,576 | 10/64 | Patterson | 248—119 X |

CLAUDE A. LE ROY, *Primary Examiner.*

FRANK L. ABBOTT, *Examiner.*